United States Patent
Zhang et al.

(10) Patent No.: US 12,505,437 B2
(45) Date of Patent: Dec. 23, 2025

(54) DIVISIBLE TOKENS

(71) Applicant: nChain Holdings Limited, St. John's (AG)

(72) Inventors: Wei Zhang, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 282 days.

(21) Appl. No.: 17/761,165

(22) PCT Filed: Sep. 1, 2020

(86) PCT No.: PCT/IB2020/058129
§ 371 (c)(1),
(2) Date: Mar. 16, 2022

(87) PCT Pub. No.: WO2021/059054
PCT Pub. Date: Apr. 1, 2021

(65) Prior Publication Data
US 2023/0316272 A1  Oct. 5, 2023

(30) Foreign Application Priority Data
Sep. 24, 2019  (GB) .................. 1913714

(51) Int. Cl.
*G06Q 20/02* (2012.01)
*G06Q 20/38* (2012.01)
*G06Q 20/40* (2012.01)

(52) U.S. Cl.
CPC ....... *G06Q 20/389* (2013.01); *G06Q 20/3825* (2013.01); *G06Q 20/401* (2013.01); *G06Q 2220/00* (2013.01)

(58) Field of Classification Search
CPC ............. G06Q 20/389; G06Q 20/3825; G06Q 20/401; G06Q 20/065; G06Q 20/223;
(Continued)

(56) References Cited

U.S. PATENT DOCUMENTS

| | | | |
|---|---|---|---|
| 8,886,938 B1* | 11/2014 | Greenwood | H04L 9/3297 |
| | | | 713/168 |
| 2017/0033933 A1* | 2/2017 | Haber | G06F 16/93 |
| 2018/0151182 A1* | 5/2018 | Wyss | G10L 17/10 |
| 2021/0006391 A1* | 1/2021 | Wei | H04L 9/0861 |
| 2021/0044965 A1* | 2/2021 | Nambisan | H04W 12/63 |

FOREIGN PATENT DOCUMENTS

| | | |
|---|---|---|
| GB | 1913318.0 | 3/2021 |
| JP | 2019508951 A | 3/2019 |
| WO | 2017145004 | 8/2017 |
| WO | WO-2017145004 A1 * | 8/2017 ......... G06F 16/1834 |

OTHER PUBLICATIONS

Antonopolus, Andreas M. Mastering Bitcoin, O'Reilly Media, Inc. Oct. 7, 2014 (Year: 2014).*

(Continued)

*Primary Examiner* — Eduardo Castilho
*Assistant Examiner* — Karlyannie M. Garcia
(74) *Attorney, Agent, or Firm* — Messner Reeves LLP

(57) ABSTRACT

A computer-implemented method of generating a second transaction for a blockchain. The blockchain comprises a first transaction comprising a first token and a first output transferring an amount of a digital asset between a second party and a first party. The first token represents a first amount of a token asset other than the digital asset, the second transaction is for transferring a second token representing a second amount of the token asset from a first party to a third party. The method is performed by the first party and comprises generating the second transaction. The second transaction comprises a first input configured to unlock the first output of the first transaction, and a first output comprising the second token. The second token comprises data representing the second amount of the token asset, the second amount being less than the first amount.

18 Claims, 9 Drawing Sheets

(58) Field of Classification Search
CPC ............... G06Q 20/02; G06Q 2220/00; G06Q 20/3678; G06Q 20/4037; H04L 9/50; H04L 63/061; H04L 63/123; H04L 63/20; H04L 2209/56
See application file for complete search history.

(56) References Cited

OTHER PUBLICATIONS

Tatsnaki Okamoto (Universal Electronic Cash) (Year: 1992).*
Claudio Ferretti, Transferable Anonymous Payments via TumbleBit in Permissioned Blockchains, 2019, p. 8-9 (Year: 2019).*
Satoshi Nakamoto, Bitcoin: A Peer-to-Peer Electronic Cash System, www.bitcoin.org, pp. 1-9.
Colored Coins, Bitcoin Wiki, 2019, pp. 1-7, https://en.bitcoin.it/wiki/Colored_Coins.
Tatsuaki Okamoto et al., Universal Electronic Cash, Advances in Cryptology—Crypto '91, LNCS 576, pp. 324-337, 1992, Springer-Verlag, Berlin Heidelberg.
Barker Elaine, Recommendation for Key Management, Part 1: General, NIST Special Publication 800-57 Part 1, Revision 4, pp. 1-160, Jan. 2016, National Institutes of Standards and Technology, Gaithersburg, MD.
GB1913714.0 Combined Search and Examination Report dated Mar. 6, 2020.
PCT/IB2020/058129 International Search Report and Written Opinion dated Feb. 1, 2021.

* cited by examiner

| TxID₂ | | | | |
|---|---|---|---|---|
| Version | 1 | Locktime | 0 | |
| In-count | 1 | Out-count | 2 | |
| Input list | | | Output list | |
| Outpoint | Unlocking script | Sequence number | Value | Locking script |
| $TxID_1 \parallel 0$ | $< Sig_{A_1} \parallel 83 >$ $< P_{A_1} >$ $< data_1 >$ | 0xFFFFFFFF | 1 satoshi | OP_HASH256 $< h_2 >$ OP_EQUAL [P2PKH $P_{A_2}$] |
| | | | 0 | OP_RETURN $< data_2 >$ |

$<data_1>$

| Field | Field Length | Value | Explanation |
|---|---|---|---|
| Prefix | 4 bytes | eGBP | |
| User ID (encrypted) | 512 bytes | $c$ | |
| RSA Modulus | 512 bytes | $N$ | |
| Balance (in hex) | 4 bytes | 0x00000019 | 25 in hex |
| Number of Payments | 4 bytes | 1 | |
| Payment 1 | ~1024 bytes | $(X_{00}, X_{010})$ | Need to include the index here |
| Extra information | | a chair from Charlie | Optional |

Figure 13

| $TxID_2'$ | | | | | |
|---|---|---|---|---|---|
| Version | 1 | | Locktime | 0 | |
| In-count | 2 | | Out-count | 3 | |
| Input list | | | Output list | | |
| Outpoint | Unlocking script | Sequence number | Value | Locking script | |
| $TxID_1 \parallel 0$ | $< Sig_{A_1} \parallel 83 >$<br>$< P_{A_1} >$<br>$< data_1 >$ | 0xFFFFFFFF | $x$ | OP_HASH256 $< h_2 >$ OP_EQUAL [P2PKH $P_{A_2}$] | |
| | | | 0 | OP_RETURN $< data_2 >$ | |
| outpoint | $< Sig_C >< P_C >$ | 0xFFFFFFFF | $z$ | [P2PKH $P_C$] | |

DIVISIBLE TOKENS

CROSS REFERENCE TO RELATED APPLICATIONS

This application is the U.S. National Stage of International Application No. PCT/IB2020/058129 filed on Sep. 1, 2020, which claims the benefit of United Kingdom Patent Application No. 1913714.0, filed on Sep. 24, 2019, the contents of which are incorporated herein by reference in their entireties.

TECHNICAL FIELD

The present disclosure relates to methods for generating a divisible token and transferring the token between parties.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

A universal electronic cash system, referred to below as the Ok-Oh system (Okamoto T., Ohta K. (1992) Universal Electronic Cash. In: Feigenbaum J. (eds) Advances in Cryptology—CRYPTO'91. CRYPTO 1991. Lecture Notes in Computer Science, vol 576. Springer, Berlin, Heidelberg), was previously proposed, in which a trusted bank would issue the electronic cash to its customers. Once the electronic cash is issued, the customer has the flexibility to divide the cash in smaller divisions. In order to spend the divisions, the receiver had to rely on the bank to verify the transaction. After the verification, the bank would then settle the transaction in fiat.

SUMMARY

Although Okamoto and Ohta addressed the issue of double spending generally, they did not consider the problem of replay double spending. This is when a customer replays their payment to another merchant. Moreover, the Ok-Oh system was limited to electronic cash.

The techniques described herein improve on the previously proposed system by using the security of a blockchain network to distribute divisible tokens which represent any asset. Like the Ok-Oh system, the divisible token may represent electronic cash. However, according to embodiments disclosed herein, the divisible token is not limited to representing electronic cash and instead can be used to represent any asset, e.g. shares in a company, a piece of art, or real estate. The divisible token may also be redeemed for a service, e.g. the token may represent a total amount (e.g. in minutes) of media content which can be streamed from a content provider.

A single token can be divided into many sub-tokens, each representing a smaller amount of the asset than the single token. These tokens can be used to redeem a service, transfer ownership, purchase goods, and so on. Furthermore, as well as providing transparency and auditability, some embodiments of the present system inherit all the benefits from the Ok-Oh system as well as solving the problem of replay double spending.

According to one aspect disclosed herein, there is provided a computer-implemented method of generating a second transaction for a blockchain, the blockchain comprising a first transaction comprising a first token and a first output transferring an amount of a digital asset between a second party and a first party, the first token representing a first amount of a "token asset" (i.e. a second or further asset) other than said digital asset, the second transaction being for transferring a second token representing a second amount of the token asset from a first party to a third party. The method is performed by the first party and comprises: generating the second transaction, wherein the second transaction comprises i) a first input configured to unlock the first output of the first transaction, and ii) a first output comprising the second token, wherein the second token comprises data representing the second amount of the token asset, the second amount being less than the first amount.

The first token is stored immutably, in the first transaction, on the blockchain and acts as a record of the amount of the token asset that has been issued to the first party. For instance, the token may be for an amount (e.g. £100) of a currency (in this case British pound sterling). The second transaction has an input for unlocking the first transaction, therefore proving to any party that they have been issued the first token. The second transaction has an output storing a second token. The second token is a division of the first token. I.e. it represents a second, smaller amount (e.g. £50 or £75) of the token asset represented by the first token. In order to divide the first token, the first party includes, in the second token, data representing the second amount. The second amount is less than the first amount. For example, the data may include one or more values. Each value represents a sub-amount of the first amount, which together add up to the second, smaller amount. For instance, if the first party wanted to transfer £75 to a third party, the second token may include two values representing £50 and £25 respectively. In this example, the third party still has £25 worth of her original token to use for a different purpose. Note that the term "token asset" is used merely as a label for the asset represented by the token. This could be a digital or physical (tangible) asset, and could be any asset other than the digital asset inherently transferred as part of the blockchain protocol of the blockchain network.

As another example, the first party (Alice) may be issued (using the first transaction) with a first token that represents full (i.e. 100%) ownership of an asset such as, e.g. a house. The first party may decide to transfer partial ownership of the house to a third party, e.g. to the first party's child, Charlie. If Alice decides to transfer 25% of her house to Charlie, she may include one or more values which, when summed together, represent 25%. E.g. a single value which represents 25%.

According to another aspect disclosed herein, there is provided a computer-implemented method of updating a second transaction for a blockchain, the blockchain comprising a first transaction comprising a first token and a first output transferring an amount of a digital asset from a second party to a first party, the first token representing a first amount of a token asset (i.e. a second or further asset) other than said digital asset, the second transaction being for transferring a second token representing a second amount of the token asset from the first party to a third party. This method is performed by the third party and comprises: obtaining the second transaction, wherein the second transaction comprises i) a first input comprising the first token, and ii) a first output comprising the second token, wherein the second token comprises one or more values, each value being used to represent a respective sub-amount of the first amount of the token asset; determining whether the second token is a valid token based on whether a) each value is generated based on at least an identifier of the first transaction, and b) the first token in the second transaction is identical to the first token in the first transaction; based on said determination, updating the second transaction by signing the second transaction with a public key of the third party; and transmitting the updated second transaction to the blockchain network for inclusion in the blockchain.

For example, the third party may receive the second transaction from the first party. The second transaction has a first input and a first output. The first input includes the first token. This may be the single token referred to above that is issued to the first party, e.g. by a bank. Alternatively, the first token may itself be a division of a larger token. The first output includes one or more values, each representing a sub-amount of the amount defined by the first token. E.g. the first amount may represent 120 units, each unit being redeemable for one minute of video, and the values may represent 45 units, e.g. one value represented 30 units and one value may represent 15 units. The third party performs a set of checks to determine the validity of the second token. If the third party is satisfied, the third party signs the second transaction (e.g. by adding an input comprising the third party's signature to the second transaction). This updates the second transaction. The obtained second transaction may be a template transaction which is not submitted to the blockchain, and the updated second transaction may be a complete transaction which is actually submitted to the blockchain.

Once the updated second transaction is included in the blockchain, the second transaction acts as an immutable record of the transfer of a particular division of the divisible token from the first party to the second party. Since the second transaction is signed by the third party (Charlie), Charlie has attested to the amount of the token redeemed by himself. The second token has been divided out of the first token. The third party is free to further divide the second token.

The third party may provide the first party with something in return for the second token, e.g. something worth the second amount of the second token. For instance, the second amount may be £75 and Charlie may give Alice £75 worth of goods or services.

According to another aspect disclosed herein, there is provided a computer-implemented method of generating a first transaction for a blockchain, the first transaction comprising a first output transferring an amount of a digital asset from a second party to a first party, the first transaction being for transferring a first token from the second party to the first party, the first token representing a first amount of a token asset (i.e. a second or further asset) other than said digital asset. This method is performed by the second party and comprises: generating the first transaction, wherein the first transaction comprises i) a first output configured to, when executed alongside an input of a second transaction, require the input of the second transaction to comprise a first public key of the first party in order to be unlocked, and ii) a second output comprising the first token, wherein the first token comprises a) the first amount of the token asset, b) an encrypted identifier of the first party, the encrypted identifier being generated by encrypting an identifier of the first party using a second public key of the first party, wherein the second public key comprises a modulus, and wherein the first token comprises c) the modulus.

The second party is the party who issues the first token to the first party. For instance, a service supplier (e.g. an energy supplier) may issue a token redeemable for an amount of a service, content, etc. (e.g. energy) to the first token. The token issuer generates a first transaction which comprises, in an output of the transaction, the token. The token itself comprises at least three data fields, one representing the full amount of the token, and one representing an encrypted identifier of the first party. The identifier is encrypted with a public key defined, at least in part, by a modulus, e.g. an RSA modulus.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 9 illustrates an example representation of a second blockchain transaction;

FIG. 10 illustrates an example representation of a second token;

FIG. 13 illustrates an example representation of an updated version of the second blockchain transaction.

DETAILED DESCRIPTION OF EMBODIMENTS

Example System Overview

Figure 1:
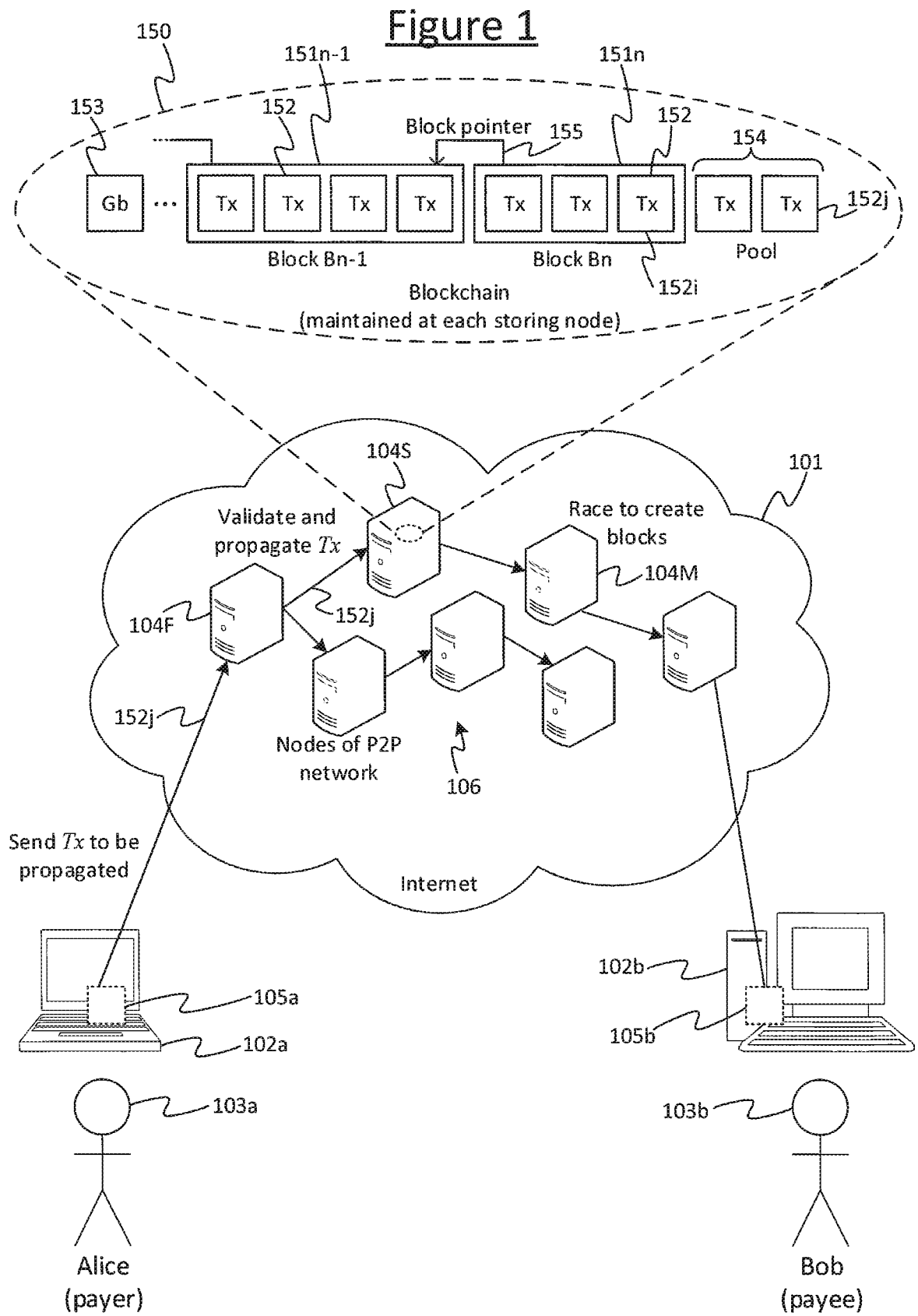
FIG. 1 is a schematic block diagram of a system for implementing a blockchain.

FIG. 1 shows an example system 100 for implementing a blockchain 150 generally. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152*j* is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

UTXO-Based Model

Figure 2:
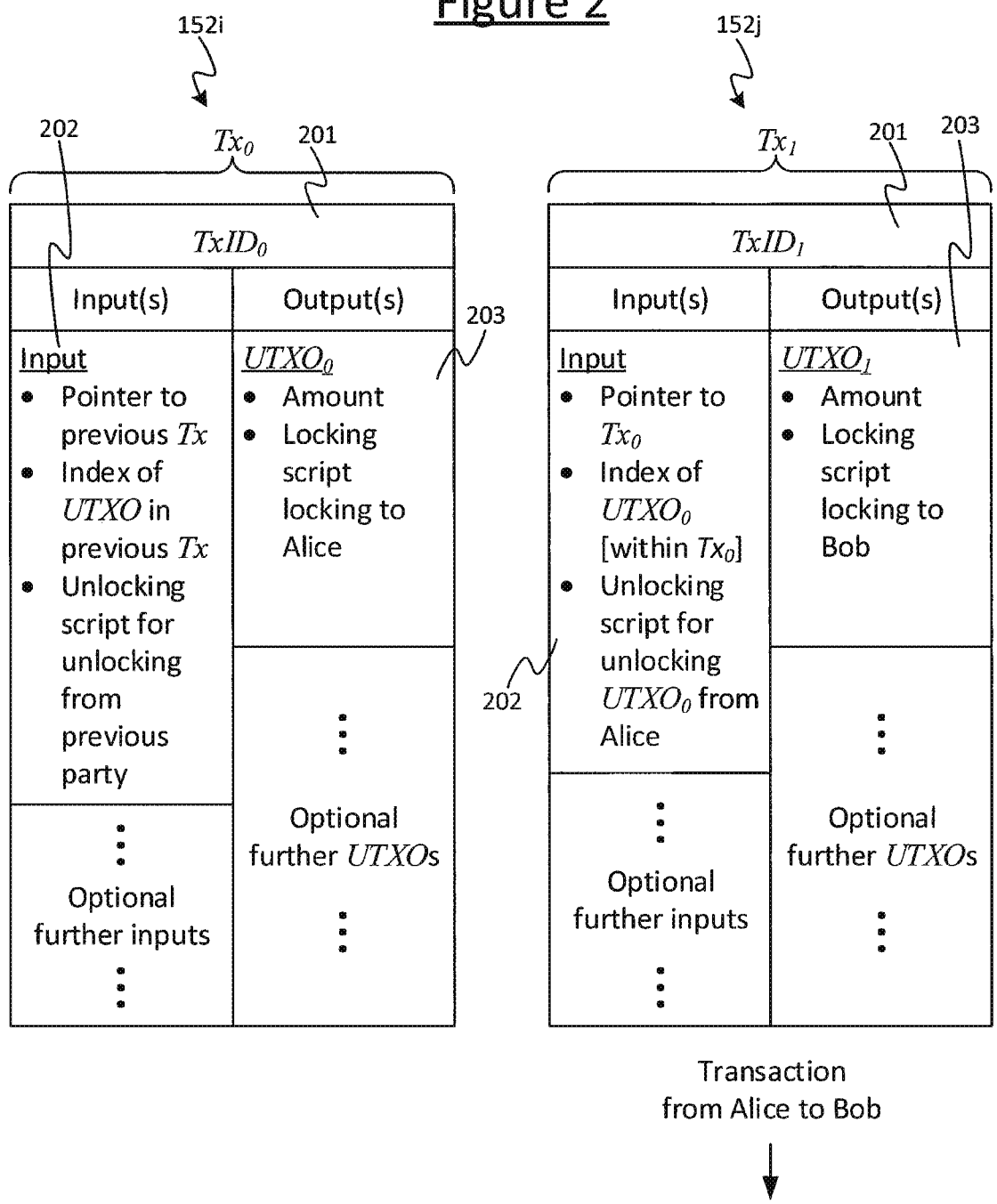
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>|[Checksig $P_A$]

where "||" represents a concatenation and "< ... >" means place the data on the stack, and "[ ... ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ in order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output UTXO. If the amount of the digital asset specified in $UTXO_0$ is greater than the amount specified in UTXO, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$]=OP_DUP OP_HASH160<H(Pa)>OP_EQUALVERIFY OP_CHECKSIG. "OP . . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
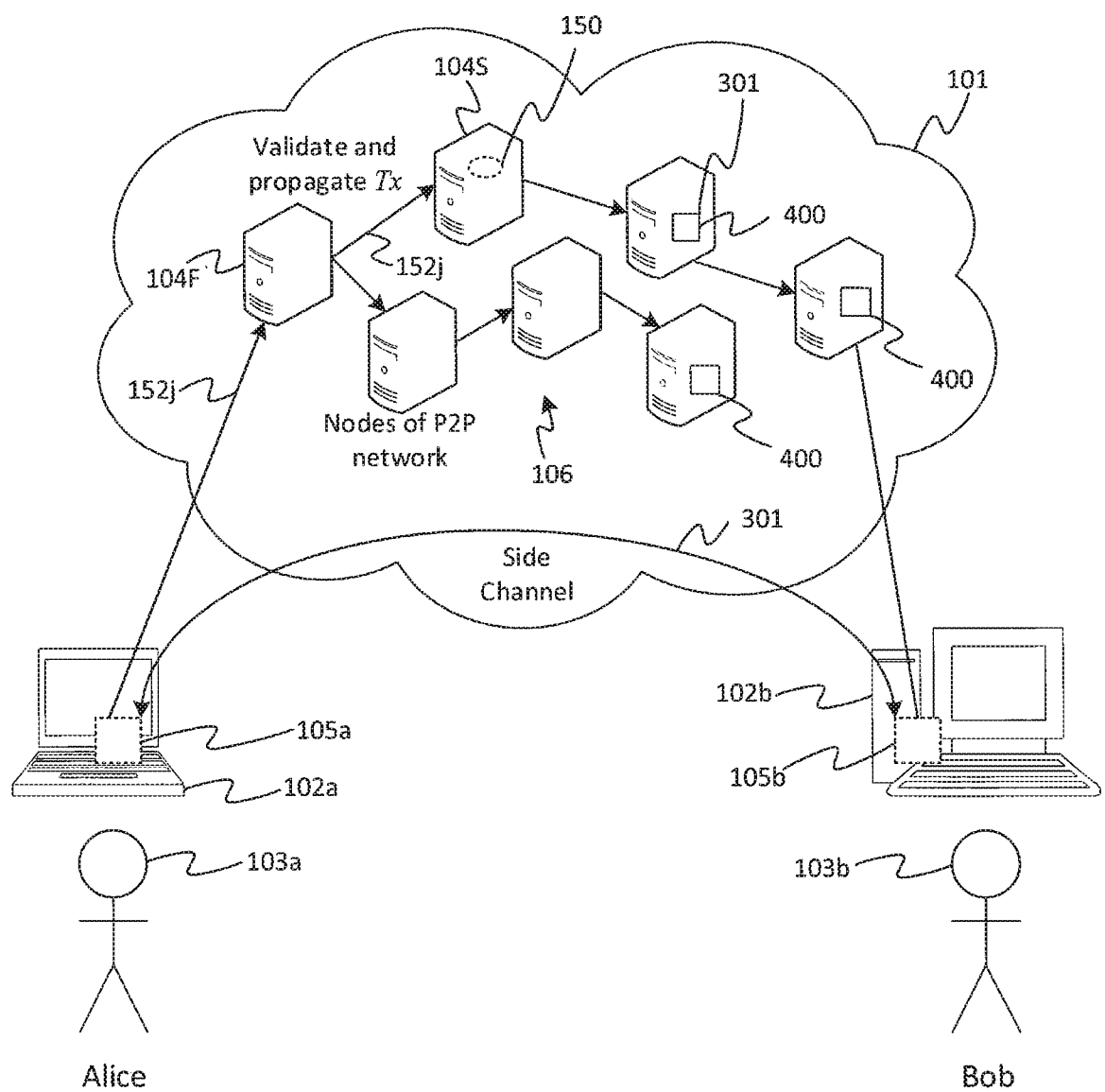
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
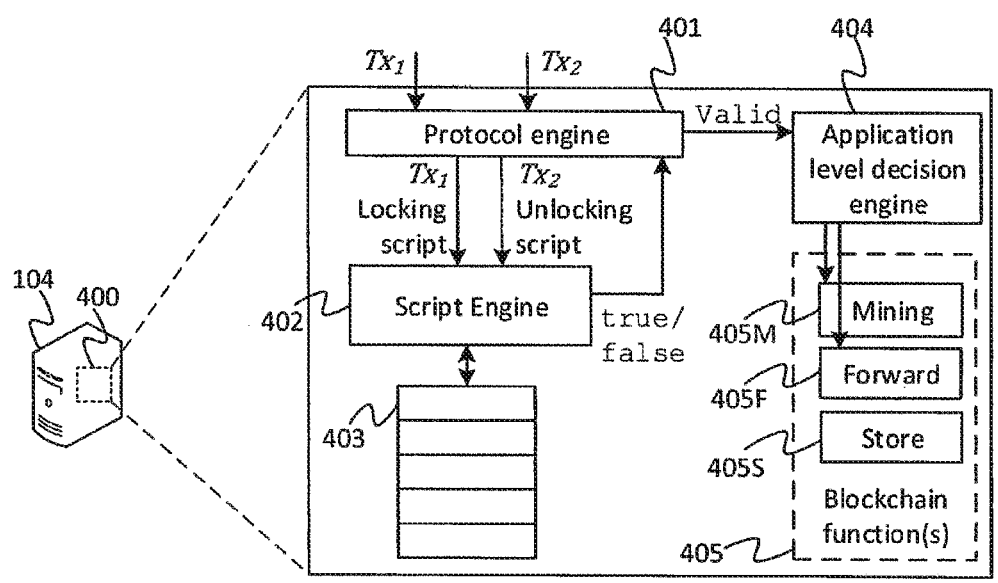
FIG. 4 is a schematic block diagram of a piece of node software for processing transactions in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction 152m ($Tx_m$) is received having an input pointing to an output (e.g. UTXO) of another, preceding transaction 152m-1 ($Tx_{m-1}$), then the protocol engine 401 identifies the unlocking script in $Tx_m$ and passes it to the script engine 402. The protocol engine 401 also identifies and retrieves $Tx_{m-1}$ based on the pointer in the input of $Tx_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $Tx_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $Tx_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $Tx_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $Tx_m$. This may comprise the mining module 405M adding $Tx_m$ to the node's respective pool 154 for mining into a block 151, and/or the forwarding module 405F forwarding $Tx_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Preliminaries

Definition 1—Rivest-Shamir-Adleman (RSA) Public Key Encryption

Given two RSA primes, p and q, the RSA modulus $N=p \cdot q$, and the Euler Quotient function $\phi(N)=(p-1)(q-1)$. The encryption key, e, is chosen such that e and $\phi(N)$ are coprime, and the decryption, d, is calculated as $d=e^{-1}$ mod $\phi(N)$. The public key is (e,N), and the private key is d. Note that p, q and $\phi(N)$ are all private, but they are not required to decrypt a ciphertext.

Definition 2—Blum Integer

An integer N is a Blum integer if N=pq for some primes p, q, and p=3 mod 4, q=3 mod 4.

Definition 3—William Integer

An integer N is a William integer if N=pq for some primes p, q, and p=3 mod 4, q=7 mod 8.

Corollary 1

A William integer is a Blum integer.

Definition 4—Quadratic Residue

Let n be a positive integer and $a \in \mathbb{Z}_2^*$. If $x^2=a$ mod n has a solution in $\mathbb{Z}_2^*$, then a is defined as a quadratic residue. Otherwise, a is defined as a non-quadratic residue.

$\mathbb{Z}_n^*$ stands for the set of integers modulo n that are coprime to n, i.e., the only common factor with n is 1. They form a group under multiplication modulo n.

Definition 5—Legendre Symbol

Let p be a prime number and $a \in \mathbb{Z}_p^*$. The Legendre symbol $$\left(\frac{a}{p}\right)$$

is defined to be 1 if a is a quadratic residue modulo p, and to be −1 if a is a non-quadratic residue.

Corollary 2

$$\left(\frac{a}{p}\right) = a^{\frac{p-1}{2}} \bmod p$$

Definition 6-Jacobi Symbol

Let n be a positive integer with factorisation $n=p_1^{r_1} p_2^{r_2} \ldots p_k^{r_k}$. If $a \in \mathbb{Z}_n^*$, the Jacobi symbol for a is defined to be $$\left(\frac{a}{n}\right) = \left(\frac{a}{p_1}\right)^{r_1} \left(\frac{a}{p_2}\right)^{r_2} \ldots \left(\frac{a}{p_k}\right)^{r_k}.$$

If $a \in \mathbb{Z}_2 \setminus \mathbb{Z}_n^*$, the Jacobi symbol for a, $$\left(\frac{a}{n}\right),$$

is defined to be 0.

Proposition 1

Let N=pq be a William integer. Then for any $a \in \mathbb{Z}_N^*$, either one of a, −a, 2a and −2a is a quadratic residue modulo N. Moreover, when da is a quadratic residue for some $d \in \{\pm 1, \pm 2\}$, then d'a is not a quadratic residue for all $d' \neq d$ and $d' \in \{\pm 1, \pm 2\}$.

Definition 7

Suppose N is a William integer, and $a \in QR_N$, where $QR_N$ is the set of quadratic residues modulo N, then $[a^{1/2^t}$ mod $N]_{QR}$ is defined to be the root of $x^{2^t}=a$ mod N such that $x \in QR_N$. Similarly, $[a^{1/2^t}$ mod $N]_1$ is defined to be a root of $x^{2^t}=a$ mod N such that $$\left(\frac{x}{N}\right) = 1,$$

and $[a^{1/2^t}$ mod $N]_{-1}$ is defined to be a root of $x^{2^t}=a$ mod N such that $$\left(\frac{x}{N}\right) = -1.$$

Definition 8

For any number $z \in \mathbb{Z}_N^*$, let $\langle z \rangle_{QR} = d \cdot z$ mod N, where $d \in \{\pm 1, \pm 2\}$ such that $dz \in QR_N$.

Similarly, let $\langle z \rangle_1 = d \cdot z$ mod N, where $d \in \{1,2\}$ such that $$\left(\frac{dz}{N}\right) = 1,$$

and let $\langle z \rangle 1 = d \cdot z$ mod N, where $d \in \{1,2\}$ such that $$\left(\frac{dz}{N}\right) = -1.$$

Proposition 2

Let N=pq be an RSA modulus. Let a be a quadratic residue modulo N. If $x_1^2=a$ mod N, $x_2^2=a$ mod N, and $$\left(\frac{x_1}{N}\right) = 1, \left(\frac{x_2}{N}\right) = -1,$$

then N can be factorised.

Proof:

$x_1^2 - x_2^2 = 0$ mod N implies that $(x_1-x_2)(x_1+x_2)=0$ mod N.

Therefore, $(x_1-x_2)(x_1+x_2)=k \cdot N$ for some integer k.

Since $$\left(\frac{x_1}{N}\right) = 1, \left(\frac{x_2}{N}\right) = -1, \text{ and } \left(\frac{-1}{N}\right) = 1, x_1 \neq \pm x_2$$

as Jacobi symbol is multiplicative. That is, $$\left(\frac{x_1}{N}\right) \cdot \left(\frac{-1}{N}\right) = \left(\frac{-x_1}{N}\right) = 1.$$

Therefore neither $(x_1-x_2)$ nor $(x_1+x_2)$ is 0 mod N. Therefore, one of them must be divisible by p but not by q. Without loss of generality, assume $(x_1-x_2)$ is divisible by p but not by q. Then, $p$ is found by finding the greatest common divisor of $(x_1-x_2)$ and N using the Euclidean algorithm.

Throughout the following, two distinct cryptographic hash functions $H_1$ and $H_2$ are used. Each has a range as $\mathbb{Z}_N$. Note that hash functions with shorter ranges can be concatenated to achieve a uniform distribution modulo N. Two cryptographic hash functions are distinct if they generate different outputs given precisely the same input. Applying the function $H_2$ may involve applying $H_1$ more than once, given that the output of the function $H_1$ will be distinct from the output of applying $H_1$ two or more times.

Definition 9=Γ Tree

Figure 5:
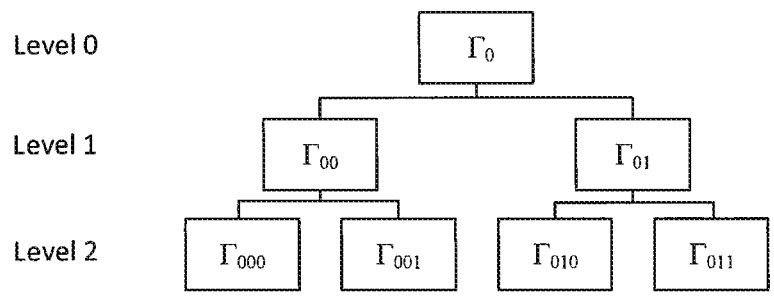
FIG. 5 schematically illustrates a binary tree structure.

A Γ tree with respect to a William integer N is a binary tree where each node is defined as shown in FIG. 5. The binary tree is made up of a root layer or level 0, and one or more child layers or levels (1, 2, . . . , t). The tree is a tree of t levels, in which each node has two child nodes (other than a lowermost level), and a root node exists at the top of the tree (as viewed in FIG. 5, or at the bottom if FIG. 5 was inversed). Therefore there are $2^{i-1}$ nodes at the $i^{th}$ level.

For Level 0 comprising the root node, $\Gamma_0 = \langle H_1(N\|0)\rangle_{QR}$. For Level i >0, let $\Omega_i = \langle H_2(N\|i)\rangle_1$. Then for each parent node $\Gamma_{parent}$, there is one left child node $\Gamma_{left}$ and one right child node $\Gamma_{right}$, where $\Gamma_{left} = [\Gamma_{Parent}^{1/2} \bmod N]_{QR}$, $\Gamma_{right} = [\Omega_i \Gamma_{parent}^{1/2} \bmod N]_{QR}$.

Divisible Tokens

Embodiments of the present disclosure provide for a protocol for generating and transferring divisible tokens. Unlike previous token systems whereby a single token can be redeemed for a single asset, a divisible token represents an initial amount of an asset, which in turn can be divided to represent different amounts of that asset. For instance, the asset may be electronic cash, or a tangible asset such as a vehicle, building, jewellery, art, etc. The asset may be a consumable, e.g. media content, a subscription, energy or water supply, etc. The divisible token can be divided up any number of times to represent smaller amounts of the initial amount. Herein, reference will be made to diving a token into smaller pieces. The token is not a physical token, per se. The term piece merely refers to a division or fraction of the token, with a smaller piece of the initial token representing a smaller amount of the asset.

Figure 6:
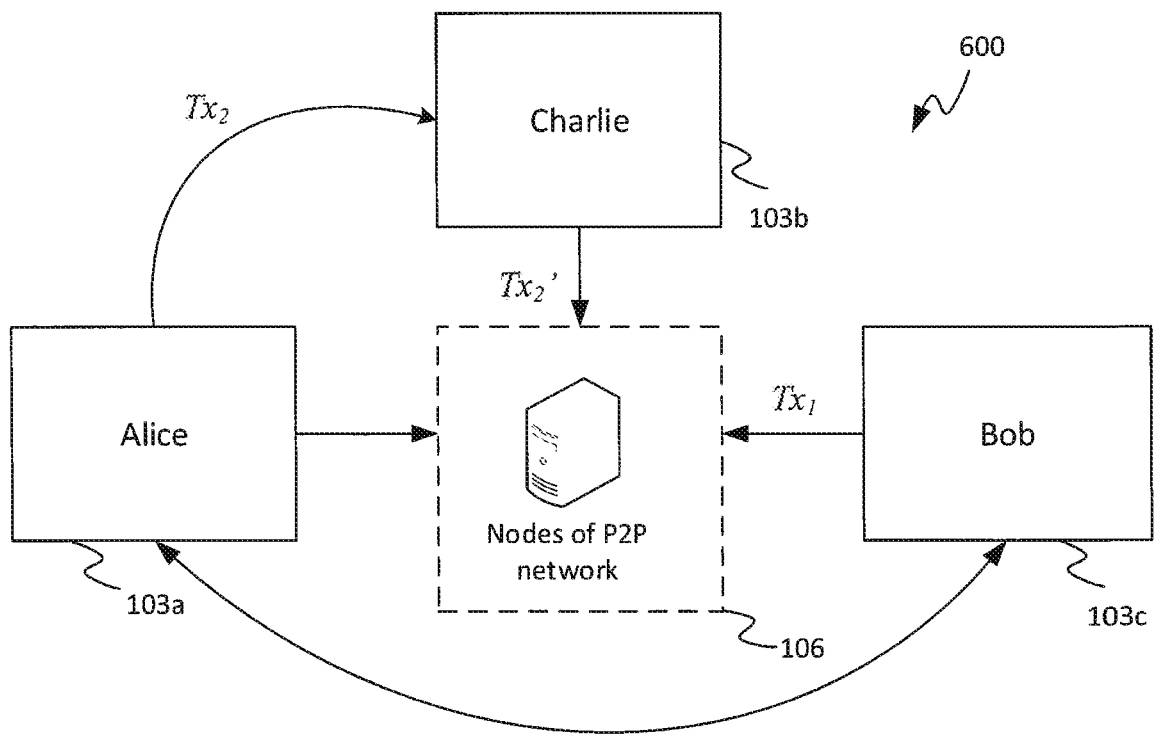
FIG. 6 schematically illustrates a system for transferring a divisible token between parties.

FIG. 6 illustrates an example system 600 for implementing the embodiments of the present disclosure. The example system comprises three parties, a first party 103*a*, a second party 103*b*, and a third party 103*c*, each operating respective computer equipment. Each party is a party to the blockchain network 106. Each of the first, second and third parties may take the role of Alice or Bob as described above with reference to FIGS. 1 to 3. Whilst FIGS. 1 to 3 describe an example scenario where Alice sends a transaction to Bob, thereby transferring an amount of a digital asset to Bob, it will be appreciated that Bob my also transfer a transaction to Alice, thereby transferring an amount of the digital asset to Alice.

Hereinafter, the first party will be referred to as Alice 103*a*, the second party will be referred to as Bob, and the third party will be referred to as Charlie. Furthermore, it will be understand that where required, reference to a first party (e.g. Alice 103*a*) is taken to mean computer equipment of the first party. Alice 103*a* and Bob 103*b* may communicate with each other using off-chain techniques, e.g. via the side channel 301 shown in FIG. 3. Similarly, Alice 103*a* and Charlie 103*c* may communicate with each other using a side channel (which may or may not be the same type of side channel as 301). Whilst not shown, Bob 103*b* and Charlie 103*c*103*c* may also communicate via a side channel.

Note that whilst three parties are illustrated in this example, in some example one party may perform the actions of two parties. For instance, Bob 103*b* and Charlie 103*c* may in fact be the same party, and may in some examples operate the same computer equipment.

As will be described in more detail below, Bob 103*b* transmits a first transaction $Tx_1$ to the blockchain network 106, Alice 103*a* may transmit a second transaction $Tx_2$ to Charlie, and Charlie may transmit an updated second transaction $Tx_2'$ to the blockchain network. As discussed above, once a transaction is transmitted to the blockchain, if it is valid it will be included in the blockchain 150.

For example, Bob may be a bank and Alice may be a customer of Bob. Bob may issue Alice with a token for an amount of money, e.g. £100. Alice may use that token to pay for goods or services from a merchant, Charlie.

According to one aspect disclosed herein, Bob 103*b* issues a first token to Alice 103*a* using the first transaction $Tx_1$. Bob 103*b* incudes the first token in an output of the first transaction $Tx_1$ and causes the first transaction to be transmitted to the blockchain network 106. This may involve Bob 103*b* himself transmitting the first transaction $Tx_1$ to one or more nodes of the network 106, or transmitting the first transaction to another party who carries out the step of submitting to the network 106. Bob 103*b* may be a trusted party such as, for example, a government, a bank, or any other well-established entity. Both Alice 103*a* and Bob 103*b* each have their own public key, $P_A$ and $P_B$ respectively. The first transaction comprises an input signed with a signature based on Bob's public key. In other words, Bob provides his public key and a digital signature which unlocks an output of an earlier transaction recorded in the blockchain. The first transaction has an output (e.g. a UTXO) which can only be unlocked with Alice's public key $P_A$, or a key derived therefrom $P_{A1}$). In other words, the first transaction is sent from Bob 103*b* to Alice 103*a*.

Bob 103*b* may send the transaction $Tx_1$ to a public key derived from Alice's public key. For instance, Alice 103*a* may have a certified public key $P_A$, and Bob 103*b* may generate a public key $P_{A1}$ using the certified public key $P_A$, such that Alice 103*a* and Bob both know the generated public key, but to other parties the link between Alice 103*a* and the public key is not obvious. Bob may obtain Alice's public key, e.g. from Alice 103*a*, or it may be publicly available. Alice 103*a* and Bob generate a shared private key $S_{AB}$, e.g. using a Diffie-Hellman exchange. Alice 103*a* and Bob can then both generate a derived public key using Alice's (certified) public key and the shared private key $S_{AB}$. Bob 103*b* may send the first transaction $Tx_1$ to $P_{A1}$. If at a later time, Bob wishes to send Alice another token, e.g. a second instance of the same first token, or a token worth a different amount of thr asset, Bob 103*b* may send the transaction to the same public key $P_{A1}$, or an updated derived public key $P_{A2}$. That is, Alice and Bob may both generate a list of keys, each based on Alice's (certified) public key and the shared secret. As an example, derived public keys may be generated using the following formula, $$P_{A_i} = P_{A_{i-1}} + H^i(s_{AB}) \cdot G, \text{ where } P_{A_0} = P_A, \text{ for } i = 1, 2, 3, \ldots$$

Note here that H is a cryptographic hash function, which may or may not be the same as $H_1$ or $H_2$.

The first token may be included in the same output as Alice's public key or a separate output. Preferably, the first token is included in an unspendable transaction output. A transaction may be made unspendable by including an opcode which terminates execution of that output, i.e. when executed alongside an unlocking script of a later transaction. One particular blockchain protocol uses an OP_RETURN opcode (or an OP_FALSE opcode followed by an OP_RETURN opcode) to achieve this function. Such an output will be referred to below as an OP_RETURN output, by way of example, but it ill be appreciated that in other implementations or protocols, other mechanisms may be employed to include payload data in the form of tokens in a spendable or unspendable output of a blockchain transaction.

Figure 7:
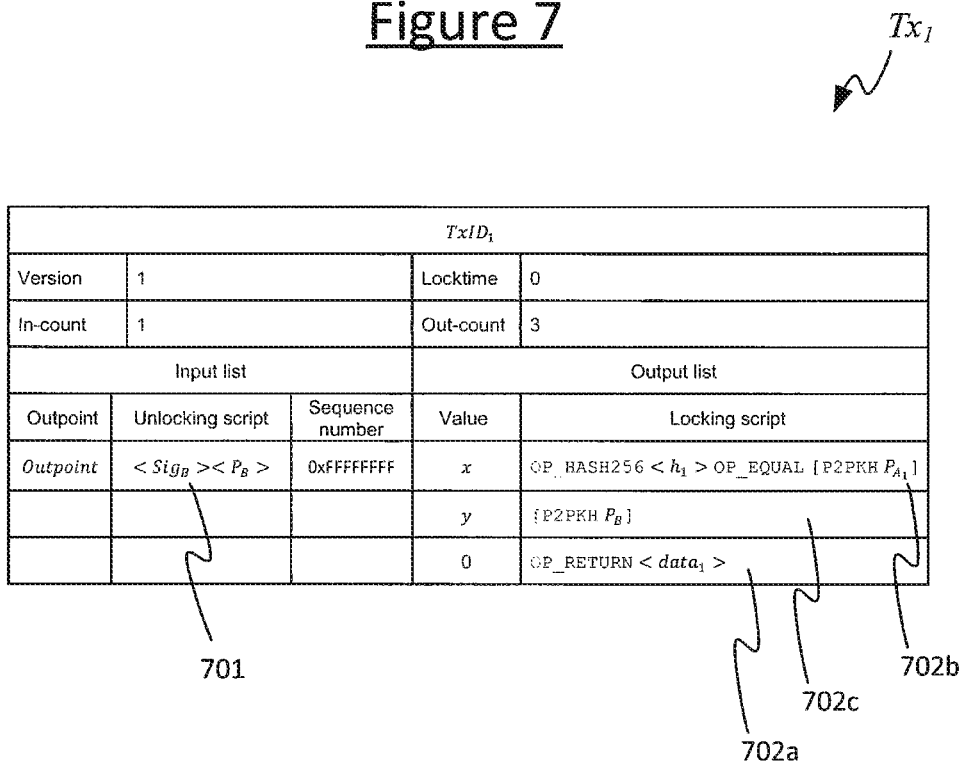
FIG. 7 illustrates an example representation of a first blockchain transaction.

FIG. 7 illustrates an example first transaction $Tx_1$. As shown, the first transaction (with transaction identifier TxID1) comprises an input list and an output list. In this example, the input list having one input 701 and the output list having three outputs 702a, 702b, 702c.

The input 701 comprises an unlocking script for unlocking a locking script of an earlier transaction referenced by an output, labelled "outpoint" in FIG. 7. The unlocking script comprises Bob's public key $P_B$ and Bob's digital signature Sigs. A first output 702a of the first transaction comprises the first token <$data_1$>. Here, "first output" does not refer to a particular order of outputs, but rather is used as a label to distinguish between different outputs. A second output 702b includes a pay-to-public-key-hash (P2PKH) to Alice's public key $P_{A1}$. That is, the second output 702b comprises a locking script which is configured to require an unlocking script attempting to unlock this locking script to include Alice's public key $P_{A1}$. Optionally, the locking script may also be configured to require the unlocking script attempting to unlock this locking script to include a pre-image which hashes to a hash $h_1$. In examples, the pre-image is <$data_1$>. That is, an input of a later transaction must comprise an unlocking script comprising the first token <$data_1$> in order to unlock the second output. The second output 702b may transfer an amount x of a digital asset to Alice 103a. Note that the digital asset is not the same as the asset represented by the first token (although in some embodiments the latter asset may still be a different type of digital asset such as a security token). Optionally, a third output 702c is included in the first transaction $Tx_1$. The third output 702c comprises a P2PKH to Bob's public key $P_B$. The third output 702c may transfer an amount y of the digital asset to Bob 103b.

As stated above, the first transaction $Tx_1$ comprises, in an output 702a, the first token. The first token <$data_1$> may be included in an unspendable output. The first token <$data_1$> comprises a plurality of data fields. Each data field comprises respective data. A first data field comprises data representing the first amount of the asset, i.e. defining the first amount. For example, the data may represent a number, e.g. 100. A second data field comprises a ciphertext. The ciphertext represents an encrypted identifier of Alice 103a. The identifier may, for example, be a public key of Alice (the same public key included in the P2PKH to Alice or a different public key). The ciphertext may be encrypted with a public key of Alice, but not the same public key as the identifier. In some examples, the identifier and the encrypting key may be part of the same public key cryptography system, or a different public key cryptography system (e.g. both RSA or RSA and ECDSA). In some examples, the public key used to encrypt Alice's identifier comprises a modulus N, and the first token comprises a third data field comprising data representing the modulus N. The first token may comprise one or more additional fields.

Optionally, Bob 103b may determine whether Alice's public key $P_A$ is certified by a trusted authority. For example, Bob 103b may determine whether Alice 103a has provided a public key certified by Bob, or another authority such as a bank, government, certificate authority, and so on. If Bob determines that Alice's public key $P_A$ is not certified, Bob 103b may decide not to issue Alice 103a with the first token, i.e. Bob does not generate the first transaction $Tx_1$ and does not transmit the first transaction to Alice 103a.

Figure 8:
FIG. 8 illustrates an example representation of a first token.

FIG. 8 illustrates an example representation of the first token <$data_1$>. The first token comprises the first amount (the balance), the RSA modulus N of Alice's public key (e,N), and the ciphertext c encrypting Alice's identifier $P_A$. The first token also comprises an indication of the asset (in this case GBP denoting British pound sterling). A data field for the number of payments is also included. For the initial token <$data_1$> issued by Bob 103b, the number of payments is zero. The number of payments represents the number of times the first token has been divided into further tokens. When Alice 103a uses the first token, e.g. to pay for a subscription, the number of payments will be increased by one. Further optional data fields may be included.

Once the first transaction $Tx_1$ is included in the blockchain 150, Alice 103a can generate a second transaction $Tx_2$. Bob 103b may first inform Alice 103a that the first transaction has been included in the blockchain, or Alice may monitor for her public key $P_{A1}$ in an unspent transaction output list (UTXO list). Alice 103a may be aware that Bob is sending an output to her derived public key, and so she monitors for that key $P_{A1}$.

In order to spend the first token, or rather an amount of the asset representing by the first token, Alice must follow a predetermined protocol. The protocol is followed by the token issuer (Bob) and the party who Alice is attempting to spend the asset with (which may be Bob or Charlie).

FIG. 9 illustrates an example second transaction $Tx_2$, with transaction identifier TxID2. Note that here generating does not necessarily imply generating from scratch. For example, Alice 103a may be issued with a transaction template, e.g. from Bob, which may include one or more pre-completed fields. The second transaction $Tx_2$ comprises an input 901 configured to unlock an output 702b of the first transaction $Tx_1$. For example, the input 901 may comprise Alice's public key $P_A$, and digital signature $Sig_A$ for unlocking the second output 702b of the first transaction. If the second output 702b of the first transaction $Tx_1$ is configured to perform a check on whether an input comprises a pre-image of $h_1$, Alice 103a may include that pre-image (i.e. the first token <$data_1$>) in the input 901 of the second transaction $Tx_2$.

The second transaction $Tx_2$ comprises one or more outputs 902. A first output 902a comprises a second token <$data_2$>, representing a second amount of the asset. The second token <$data_2$> may be included in an unspendable transaction output of the second transaction, e.g. an OP_RETURN output. The second amount is the amount of the asset that is being transferred, spent, redeemed, etc.

The second token <$data_2$> comprises data representing the second amount. For instance, the second token may comprise one or more values X, each of which represent a sub-amount (or a division) of the first amount. For instance, the second amount may be 75, and the values X may together represent 75 (e.g. 50 and 25). The values X will be discussed in more detail below with reference to FIGS. 11 and 12. The second transaction $Tx_2$ may comprise a second output 902b. The second output 902b may be a P2PKH to Alice's public key. The public key may be a previously used public key $P_Ai$ or a new public key $P_{A2}$ (e.g. a public key derived from PA1). Like the second output 702b of the first transaction $Tx_1$, the second output 902b of the second transaction $Tx_2$ may require an unlocking script attempting the unlocking script to comprise the second token <$data_2$>. In other words, the locking script requires a pre-image of a hash $h_2$, the pre-image being the second token <$data_2$>.

FIG. 10 illustrates an example representation of the second token <$data_2$>. The second token is an updated version of the first token <$data_1$>. The one or more values X are included within a payment field of the second token. One or more data fields of the second token <$data_2$> may be the same as the first token. For instance, the prefix representing the type of asset, the encrypted identifier c of Alice, and the RSA modulus N may remain the same. One or more data fields of the second token may differ from those of the first token. For example, Alice 103a may change the field representing the remaining amount of the token (the balance) to reflect that the second amount of the asset is being transferred. As another example, the number of payments field will also change, increasing from 0 to 1. Alice 103a may also include additional information relating to the payment.

Once the second transaction $Tx_2$ has been generated, Alice 103a may transmit the transaction to the blockchain network 106. Additionally or alternatively, Alice 103a may transmit the transaction to Bob or Charlie 103c. Alice 103a may transmit the second transaction to Bob 103b if she is spending the token with the token issuer (Bob 103b). Alice 103a may transmit the second transaction $Tx_2$ to Charlie if she is spending the token for an asset offered by a different party, i.e. Charlie.

In some embodiments, the protocol requires that the first token (or rather the amount represented by the first token) can be divided according to a binary tree-like structure. At a $0^{th}$ layer (root layer) of the tree, a single root node $\Gamma_0$ represents the total amount of the first token. At a $1^{st}$ layer (first child layer) of the tree, each child node $\Gamma_{00}$, $\Gamma_{01}$ represents 50% of the total amount of the first token, i.e. there are two child nodes, each representing the same amount of the total amount. At a $2^{nd}$ layer (second child layer) of the tree, each child node $\Gamma_{000}$, $\Gamma_{001}$, $\Gamma_{010}$, $\Gamma_{011}$, represents one half of the amount represented by a child node in the second layer (i.e. 25% of the total amount). In other words, there are four child nodes in the second child layer, which together represent the total amount. This process of successively halving an amount represented by a given node may continue any number of times. Note that the number of times is not necessarily limited to the smallest division of the asset that can be redeemed. For instance, the smallest denomination of GBP is one penny. However, the first token can be divided into amounts that are less than one penny.

Figure 11:
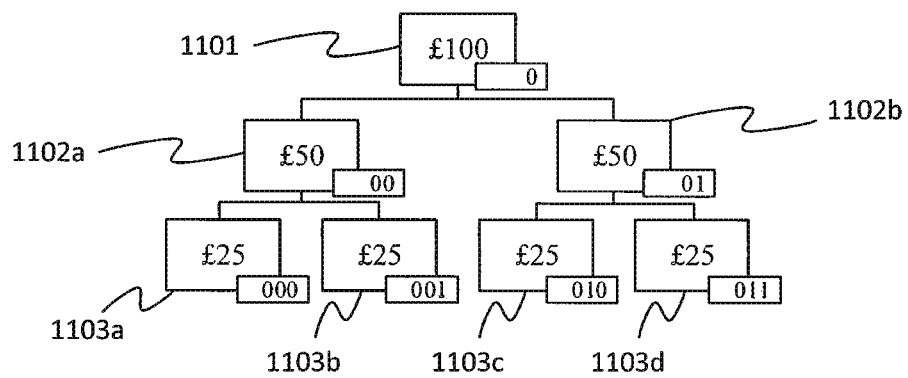
FIG. 11 schematically illustrates a mapping between amounts of a token and nodes of the binary tree structure.

FIG. 11 illustrates how a first token can be divided according to this protocol. As shown, the root node 1101 in a root layer represents £100, each child node 1102a, 1102b in a first child layer represents £50, each child node 1103a-d in second child layer represents £25. In turn, the child nodes 1103a-d in the second child layer could be divided, and those child nodes could be divided, etc. Put another way, each child node represents (or maps to) a sub-amount of the first amount. The first layer comprises two child nodes 1102a, 1102b. In this layer, each child node 1102a, 1102b represents the same sub-amount (a "first sub-amount") of the first amount. The second layer comprises four child nodes 1103a-d. Each node in the second layer represents the same sub-amount (a "second sub-amount") of the first sub-amount. The first amount, the first sub-amount and the second sub-amount are different amounts. Referring to FIG. 11, £100 (first amount) is split into two lots of £50 (first sub-amount) in the first child layer, which is then split into four lots of £25 (second sub-amount) in the second child layer. The sub-amounts represented by each pair of child nodes in a given layer combine to give the sub-amount (or amount) represented by their parent node in a "higher" layer.

If the first token, and therefore the root node, represents a first amount A, an $i^{th}$ layer of the tree structure comprises $2^{i-1}$ nodes. Therefore each node in the $i^{th}$ layer represents an amount $A*2^{1-i}$.

Let's say Alice wants to transfer £75 (the second amount) to Charlie 103c using the second token. Using the example tree structures of FIG. 11, Alice would have to include two values in the second token, which together represent £75. A first value would represent £50 (first sub-amount) and the second value would represent £25.

Alice 103a could simply include the values 50 and 25 in the second token. However, this would allow Alice to double spend her token. E.g. Alice could send a second transaction $Tx_2$ to Charlie 103c which includes a token (and values) representing £75, and then send another transaction to a different party which also includes a token (and values) representing £75, or in general any amount greater than the remaining balance of her token.

To prevent these problems, Alice, Bob 103b and Charlie 103c agree to follow a protocol where each node in the tree is calculated based on specific components. Each child node is based on the root node. Each root node is based on an (RSA) modulus N used to encrypt Alice's public key $P_A$. The root node may also be based on the identifier $TxID_1$ of the first transaction $Tx_1$. That way, the root node is linked to the first transaction. In some examples, the root node is calculated by applying a cryptographic hash function $H_1$ to the modulus N and, optionally, the first transaction identifier $TxID_1$.

Figure 12:
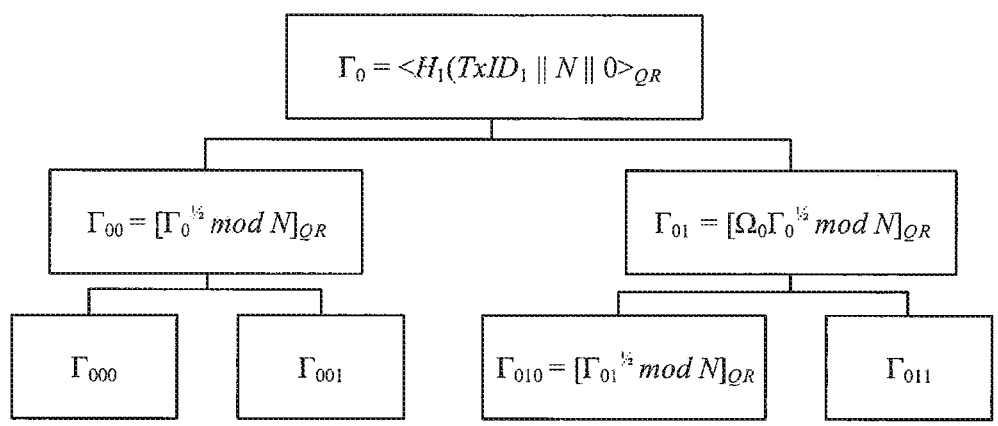
FIG. 12 schematically illustrates a binary tree structure with equations for calculating nodes of the tree.

The hierarchical tree structure may be constructed such that the nodes are calculated as shown in FIG. 12, using the following equations, For Level 0 comprising the root node, $\Gamma_0 = <H_1(TxID_1\|N\|0)>_{QR}$. For Level $i > 0$, $\Omega_i = <H_2(TxID_1\|N\|i)>_1$. Then for each parent node $\Gamma_{parent}$, there is one left child node $\Gamma_{left}$ and one right child node $\Gamma_{right}$, where $$\Gamma_{left} = [\Gamma_{Parent}^{1/2} \bmod N]_{QR}.$$

$$\Gamma_{right} = [\Omega_i \Gamma_{Parent}^{1/2} \bmod N]_{QR}.$$

As mentioned above, there is no limit to the number of child layers in the tree, and therefore no limit to the number of child nodes that may be constructed. In other words, a first amount (represented by the root node) may be divided into $2^t$ child nodes for any non-negative integer t. Note that Alice 103a does not necessarily have to calculate each node of the tree. Instead, Alice need only calculate the nodes which are needed to represent the amount to be transferred to Charlie 103c using the second token. For example, referring to FIGS. 11 and 12, if Alice wanted to transfer £50 using the second token, Alice would only need to calculate $\Gamma_{00}$ (representing £50) or $\Gamma_{01}$ (representing £50) but not both, although she could. If Alice wanted to transfer £75 using the second token, Alice would only need to calculate $\Gamma_{00}$ (representing £50) and $\Gamma_{01}$ (representing £25). Alice could calculate more values, e.g. $\Gamma_{00}$ (representing £25) but it is not necessary.

Now, Alice 103a could use the nodes as the values placed in the token to represent the second amount. However, this would allow a third party to calculate Alice's modulus N and thus compromise Alice's public key $P_A$.

In order to prevent such a security compromise, preferably, for each node in the tree required to represent the second amount, Alice generates one of the node's square roots X. The square root values X of the required nodes are included in the first token, and each square root value is used to represent a respective sub-amount of the total amount. For example, Alice calculates the square root $X_{01}$ of node $\Gamma_{01}$ to represent £50, or A/2. Alice would calculate the square root $X_{010}$ of node $\Gamma_{010}$ to represent £25, or A/4, and so on.

In other words, the tree represents a divided token. When a node of the tree is spent, an X value is revealed. A verifier can calculate the corresponding F values for that node and nodes above that node. Any leakage of F values for the nodes below that node will allow the public to factorise N and hence to reveal Alice's identity. Any leakage of X values for the nodes above that node will also have the same effect.

Suppose that Alice would like to pay Charlie £75, e.g. for a chair. Alice calculates $$\Gamma_0 = \langle H_1(\text{TxID}_1 \| N \| 0) \rangle_{QR} \qquad 1.$$

$$\Omega_0 = \langle H_2(\text{TxID}_1 \| N \| 0) \rangle_1 \qquad 2.$$

$$X_{00} = [\Gamma_0^{1/4} \bmod N]_{-1} \qquad 3.$$

$$X_{010} = [\Omega_0^2 \Gamma_0^{1/8} \bmod N]_{-1} \qquad 4.$$

Note that the "0" in the calculation of $\Gamma_0$ is not essential. It the example above, the "0" is merely used as an index and so could be represented by any data could be used as an index. When calculating $\Omega_0$, Alice may apply an index (in this case "0"). Depending on the division of the token, Alice may need to calculate other values of $\Omega_i$. In that case, Alice applys a different index for each $\Omega_i$ (e.g. "01" for $\Omega_{01}$).

$X_{00}$ is one of the square roots of $\Gamma_{00}$ such that $$\left(\frac{X_{00}}{N}\right) = -1.$$

Any other spending on the left-hand side branch will give away another distinct square root of $\Gamma_{00}$. Hence, by Proposition 2, N can be factorised to reveal Alice's identity. Alice's identity $P_A$ is revealed and as such she can be, for instance, subject to the legal implications of double spending, and/or banned from being issued tokens by Bob 103b in the future.

Note that any spending of the parent $\Gamma_0$ will have to reveal a square root $X_0$ such that $$\left(\frac{X_0}{N}\right) = -1.$$

$X_{00}$ will allow the public to calculate $\Gamma_{00} = X_{00}^2 \bmod N$. Then, the public will have two distinct square roots of $\Gamma_0$. Hence, the factorisation of N is revealed.

$X_{010}$ is one of the square roots of $\Gamma_{010}$ such that $$\left(\frac{X_{010}}{N}\right) = -1.$$

Similar as above, any spending of the children nodes or the parent node of $\Gamma_{010}$ will reveal the factorisation of N. However, spending $\Gamma_{011}$ does not allow N to be factorised.

As mentioned above, Alice 103a does not have to calculate the entire tree, though she can if so desired. She can go through the paths from the top and calculate the value of each node as necessary. However, is important that she does publish all the values as the leakage of the children's $\Gamma$ values together with the X values will compromise the factorisation of N. For example, $X_{00}$ and $\Gamma_{000}$ will give two distinct square roots of $\Gamma_{00}$.

Alice 103a can add payment detail to the second token, e.g. Alice could provide the indices corresponding to the X values. For example, 00 is the index for $X_{00}$. By having these indices and the balance, Charlie 103c can work out the opening balance and the values represented by the X values. To save some computation, the values X of the opening balance and the sub-amounts corresponding to the X values could be added to the second token.

Once the second transaction $Tx_2$ is generated and includes the second token with the appropriate values, Alice transmits the second transaction to Charlie. In other words, Alice sends ($X_{00}$, $X_{010}$, N) to Charlie via transaction. Alice may also send the first token in the same transaction, e.g. the previous OP_RETURN payload <data$_1$>. Note that Alice does not need to reveal the F tree.)

The input 901 of the second transaction $Tx_2$ is linked to the second output 702b of the previous transaction. This is the field where Alice 103a can pass the first token (e.g. the OP_RETURN data payload of the first transaction $Tx_1$) to Charlie 103c. The input 901 also includes a signature that can hold Alice 103a accountable if she double spends or violates the protocol rules. To provide Alice 103a with a certain level of privacy, the public key $P_{A1}$ used to generate the signature may be a derived key. To the public, the public key looks random. However, both Alice and Bob (e.g. a bank) can attest the linkage between the public key and Alice's identity if there is a dispute.

Alice 103a may configure the first output of the second transaction $Tx_2$ to allow Charlie 103c to add an input to the second transaction. For instance, according to some blockchain protocols, Alice 103a can include an identifier or flag in her input which allows another input to be added to the transaction without invalidating the transaction. Alice 103a may use sighash flags SIGHASH_SINGLE (0x03) and SIGHASH_ANYONECANPAY (0x80) for her signature. Here, SIGHASH_ANYONECANPAY allows others to fund the transaction. For example, Charlie 103c may fund the transaction. SIGHASH_SINGLE protects Alice's input and the Alice's output. Note that these flags do not protect any OP_RETURN output with Alice's signature $\text{Sig}_{A1}$. However, any modification to the OP_RETURN will result in a different hash value from the one that is embedded in the first output, which is protected by the signature. Moreover, any modification on the input, including modification on the first token (data$_1$) will result in a failure when checking with the previous locking script.

As of now, transaction $\text{TxID}_2$ may not be valid to a miner due to the absence of transaction fees. Alternatively, Alice can include enough fees to satisfy the miner. However, it does contain all the information Charlie 103c requires to verify Alice's payment, and Alice's signature and the hash function (which may be any script hash function such as, for instance, SHA256 or double SHA256) provide authenticity and integrity of all the information.

Charlie 103c obtains the second transaction $Tx_2$ from Alice 103a. The second transaction $Tx_2$ includes the second token <data$_2$>, which includes the values representing the second amount of the asset to be transferred to Charlie 103c. Charlie 103c may obtain the transaction directly from Alice 103a, or via an intermediary source. The second token also includes the remaining balance of the token, e.g. a balance that Charlie himself could spend.

Charlie 103c determines whether the first token <$data_1$> included in the second transaction $Tx_2$ is the same as the first token <$data_1$> included in the first transaction $Tx_1$ (e.g. by obtaining the first transaction from the blockchain). In examples where the first transaction $Tx_1$ comprises an output 702c comprising a hash $h_1$ of the first token, Charlie checks whether the first token <$data_1$> in the second transaction matches that of the first transaction by applying a cryptographic hash function $H_1$ to the first token (recall that the first token in the first transaction is the pre-image of the hash included in the output of the first transaction). If the first tokens do not match, Charlie 103c knows that Alice 103a has changed at least part of the first token and as such is not abiding by the protocol. In that case, Charlie 103c will not sign the second transaction or submit it to the blockchain.

Charlie 103c also determines whether the values X representing the sub-amounts are each based on an identifier $TxID_1$ of the first transaction $Tx_1$. Charlie 103c may also determine whether the values X are also based on the (RSA) modulus included in the token. For example, Charlie may determine whether the values X are based on $\Gamma_0$=<$H_1$($TxID_1$||N||0)>$_{QR}$. To check this, Charlie obtains the transaction identifier and the modulus from the first $Tx_Z$ or second transaction $Tx_2$, and applys the hash function to the data.

If Charlie 103c is satisfied, Charlie updates the second transaction by signing the second transaction with his public key $P_C$. That is, Charlie 103c adds an input to the updated second transaction $Tx_2'$ comprising his public key $P_C$ and digital signature $Sig_{PC}$. Charlie then submits the updated second transaction $Tx_2'$ to the blockchain network 106.

Charlie 103c may determine whether the output 702b of the first transaction $Tx_1$ paid to Alice 103a is amongst the blockchain's unspent transaction outputs. In other words, whether the outpoint, $TxID_1$||0, is still in the UTXO set. If the outpoint is not in the UTXO set, Alice 103a has attempted to redeem the first token with the same party (i.e. Charlie) or a different party.

If Alice 103a, Bob 103b and Charlie 103c are following the protocol whereby each token is represented by the tree structures of FIGS. 5 and 11, Charlie may determine the amounts represented by the values X based on the tree structure. In some examples, Alice 103a may have included indices in the first token which map a given value to a particular position in the tree structure. When checking that the first amount, balance amount, and second amount, Charlie determines whether a sum of the sub-amounts represented by the values in the tree structure corresponds to the first amount minus the balance amount.

Charlie 103c may use the values X in the second token to calculate one or more "candidate nodes". Each candidate node $\Gamma$ is calculated by raising a respective value X to a power based on the tree index of the value. For example, a value X with an index corresponding to a child node in a first child layer of the tree will be raised to a power of 4, a value with an index corresponding to a child node in a second child layer of the tree will be raised to a power of 8, a value X with an index corresponding to a child node in a third child layer of the tree will be raised to a power of 16, and so on. The power is doubled for each successive layer in the tree. The reason for this is that each value X is a square root of a child node in the tree. Therefore, the value must be squared (raised to the power of 2) to generate the child node. Each child node is a square root of a parent node in the tree. Therefore, each child node must be squared to generate the parent node. If the parent node is itself a child node, that node must be squared as well, and so on until the root layer is reached.

If the candidate node $\Gamma$ is a left-child node $\Gamma_{left}$, the candidate node should map to the root node by multiplying the candidate node by some value d. The value d accounts for the fact that each number has a positive and negative square root. The value d depends on the position of the candidate node in the tree, i.e. how many times the candidate node is squared to reach the root layer. For instance, for a candidate node generated from a left-child node $\Gamma_{left}$ in the first child layer, $d_1 \in \{\pm 1, \pm 2\}$. If the candidate node is a left-child node $\Gamma_{left}$, the candidate node should map to the root node by multiplying the candidate node by some value d.

If the candidate node $\Gamma$ is a right-child node $\Gamma_{right}$, the candidate node should also map to the root node by multiplying the candidate node by some value d. The value d will also depend on the position of the candidate node in the tree. If the child nodes are calculated according to $\Gamma_{right} = [\Omega_i \Gamma_{parent}^{1/2} \mod N]Q$, Charlie needs to calculate $\Omega_i$. $\Omega_i$ may be calculated using the information obtained from the first or second transaction, namely $TxID_1$ and N. When a value X corresponding to a right-child node $\Gamma_{right}$ is squared (one or more times) to generate a candidate node, the candidate node will be comprise a factor of $\Omega_i$. Therefore a candidate node should map to the root node via the relationship $\Gamma''=\Omega_i^n\Gamma_0$, where n will depend on the power to which the value is raised. Note that $\Omega_i$ SU needs to be calculated independently for each i.

Charlie 103c may perform one or more further checks to verify the second token. For example, Charlie may check that each value obeys the relationship $$\left(\frac{x}{N}\right) = -1,$$

where N is the modulus.

As mentioned above, Charlie 103c verifies the second token and if satisfied, submits an updated second transaction $Tx_2'$ to the blockchain. If Charlie 103c issued the first token himself, Charlie 103c may provide Alice 103a with goods, services, content, etc. worth the value of the second token. For example, if Charlie 103c is a content provider and the token represents an amount of content, Charlie may provide Alice 103a with content worth the amount of the second token. If Bob 103b issued the first token, Bob may provide Charlie with the second amount of the token. For example, Bob may be a bank and the token may represent electronic cash. Once the updated second transaction $Tx_2'$ appears on the blockchain, Bob may transfer electronic cash worth the second amount to Charlie 103c.

The following sets out an example flow of steps taken by Alice 103a, Bob 103b and Charlie in an example scenario where Alice 103a is a customer to a bank, Bob, and Charlie is a merchant who expects to receive a payment from Alice 103a. It will be appreciated that some steps are not essential.

Alice 103a has a public key (e.g. an ECDSA public key) representing her identity, $P_A$, which may be certified by trusted authorities such as a government or a well-established entity, and Bob also has a public key (e.g. an ECDSA public key), $P_B$. Note that $P_A$ may not be widely publicly available (e.g. $P_A$ may relate to a national identity number or a passport number), while $P_B$ is publicly available (e.g. $P_B$ may relate to an online banking website certificate).

Suppose Alice 103*a* would like to get a token that represents £100 from Bob 103*b*.

Step 1: Alice 103*a* generates two RSA prime numbers, p and q, and calculates the public key (e,N) and the private key d.

Step 2: Alice 103*a* passes on $P_A$ and (e,N) to Bob. Bob 103*b* verifies Alice's identity and her account, i.e., is she eligible to be issued a £100 token.

Step 3: Bob 103*b* encrypts Alice's identity public key $P_A$ with (e,N) to create a ciphertext c. Note that this ciphertext will be published on-chain. If Alice 103*a* double spends her token, her RSA private keys will be derivable by the public. Therefore, her identity will be revealed publicly and Alice 103*a* may be punished for double spending.

Step 4: Alice 103*a* and Bob 103*b* first establish a shared secret, $s_{AB}$, via Diffie-Hellman key exchange on $P_A$ and $P_B$. Both of them then derive a list of public keys, $P_{A_i}=P_{A_{i-1}}+H^i(s_{AB}) \cdot G$, where $P_{A_0}=P_A$, for i=1, 2, 3, .... These public keys will allow Alice 103*a* to create and spend transactions by herself. At the same time, Bob will be able to monitor the transactions as he knows them too.

Step 5: Bob 103*b* creates a first blockchain transaction that issues Alice 103*a* the £100 token, as shown in FIG. 7. An output of the transaction is a coloured output. It is paid to Alice's public key $P_{A_1}$. In order to spend the output, Alice must provide the pre-image of the hash value $h_1$ and her ECDSA signature that is verifiable by $P_{A_1}$. In this particular example, the transaction includes an OP_RETURN output to colour the output. The data payload contains all the information the public needs to know in order to verify a payment from Alice, including the pre-image of $h_1$. More precisely, the data payload may have the format shown in FIG. 8.

It is understood that the hash puzzle in the locking script seems redundant as the pre-image is available in OP_RETURN. However, this small extra data in the locking script allows any party to verify Alice's payment without obtaining the entire transaction. It is Alice's responsibility to keep and present the data payload. This will be very useful when miners to whom merchants connect are running on pruned blockchain. Note that all outputs are signed by Bob 103*b* and it can be verified with a trusted public key $P_B$. Therefore, Alice 103*a* will not be able to tamper any data in the outputs.

In the first transaction $Tx_1$, Bob 103*b* effectively signs the statement that the owner of $P_{A_1}$ knows the factorisation of N. As Bob is trusted, all Charlie 103*c* needs to do is to verify a signature from Alice with $P_{A_1}$.

Step 6: Suppose that Alice 103*a* would like to pay a merchant Charlie £75 for a chair. Alice calculates $$\Gamma_0 = <H_1(TxID_1 \| N \| 0)>_{QR} \qquad 1.$$

$$\Omega_0 = <H_2(TxID_1 \| N \| 0)>_1 \qquad 2.$$

$$X_{00} = [\Gamma_0^{1/4} \bmod N] \qquad 3.$$

$$X_{010} = [\Omega_0^2 \Gamma_0^{1/8} \bmod N]_{-1} \qquad 4.$$

The $\Gamma$ tree together is illustrated in FIG. 12, and the cash amounts represented by the noes of the $\Gamma$ tree are illustrated in FIG. 11.

As mentioned previously, Alice 103*a* calculates the required node values of the tree, and their square roots. Alice 103*a* does not have to calculate the entire tree. She can go through the paths from the top and calculate the value of each node as necessary. It is important that she does not publish all the values of the tree as the leakage of the children's $\Gamma$ values together with the X values will compromise the factorisation of N. For example, $X_{00}$ and $\Gamma_{000}$ will give two distinct square roots of $\Gamma_{00}$.

Alice 103*a* then sends ($X_{00}$, $X_{010}$, N) to Charlie, via a blockchain transaction templates, together with the previous OP_RETURN payload $data_1$. Note that Alice 103*a* does not need to reveal the F tree. The transaction is illustrated in FIG. 9 The $data_2$ payload can be represented by FIG. 10.

To add payment detail to the payload, Alice 103*a* needs to provide the index corresponding to the X values. For example, 00 is the index for $X_{00}$. By having these indices and the balance, one can work out the opening balance and the values represented by the X values. However, we can save some computation by providing values explicitly. That is to add opening balance and values corresponding to the X values to the payload.

The input of this transaction is the first output of the previous transaction. This is the field where Alice 103*a* can pass previous OP_RETURN data payload to Charlie 103*c* and a signature that can hold Alice 103*a* accountable if she double spends or violates rules. To the public, the public key looks random. However, both Alice 103*a* and Bob 103*b* (the bank) can attest the linkage between the public key and Alice's identity when there is a dispute.

Alice 103*a* uses sighash flags SIGHASH_SINGLE (0x03) and SIGHASH_ANYONECANPAY (0x80) for her signature. SIGHASH_ANYONECANPAY allows others to fund the transaction. In this example, the merchant, Charlie, will fund the transaction. SIGHASH_SINGLE protects Alice's input and the first output. Note that the OP_RETURN output is not protected by the signature. However, any modification on the OP_RETURN will result in a different hash value from the one that is embedded in the first output, which is protected by the signature. Moreover, any modification on the input, including modification on $data_1$ will result a failure when checking with the previous locking script.

As of now, transaction $TxID_2$ may not be valid to miner due to the absence of transaction fees. However, it does contain all the information Charlie 103*c* requires to verify Alice 103*a* payment, and Alice's signature and the hash function provide authenticity and integrity of all the information.

Note that Alice 103*a* can spend her coloured outpoint in any other way as she has full control over it. However, if she does not follow the protocol, she will lose all the token value represented by this outpoint.

Step 7: Let $H_0$ denote the hash function double-SHA256, OP_HASH256.

Charlie performs the following calculations and checks:
1. Check $H_0$ ($data_1$)=$h_1$ where $h_1$ is recoded on-chain and signed by Bob in $TxID_1$.
2. The outpoint, $TxID_1|0$, is still in the UTXO, i.e., unspent.
3. Parse $data_1$ to obtain N and other information.
4. Parse $data_2$ to obtain the payment information.
5. Check $$\left(\frac{X_{00}}{N}\right) = -1.$$

6. Check $$\left(\frac{X_{010}}{N}\right) = -1.$$

7. Calculate $\Gamma'=X_{00}^4 \bmod N$.
8. Calculate $\Gamma''=X_{010}^8 \bmod N$.
9. Check $\Gamma'=d_1 \cdot H_1(TxID_1\|N\|0)$ for some $d_1 \in \{\pm 1, \pm 2\}$. (It is expected to be $\Gamma_0$)
10. Check $\Gamma''=(d_2 \cdot H_2(TxID_1\|N\|0))^2 \cdot \Gamma''$ for some $d_2 \in \{1, 2\}$. (It is expected to be $\Omega_0^2 \Gamma_0$).
11. Check $H_0(data_2)=h_2$
12. Check the balance plus the payment is equal to the opening balance.

If all checks are passed, Charlie 103c accepts the payment and updates the transaction by adding his input and output. As the transaction from Alice is signed using SIGHASH_ANYONECANPAY and SIGHASH_SINGLE, Charlie can do this without invalidating Alice's signature. The updated transaction is shown in FIG. 13.

The third output is simply the change for Charlie 103c. His difference between his input and his change will be the transaction fee paid to miners. In addition to that, Charlie's input also serves the following purposes:
1. Attestation to Alice's payment,
2. Notification to Bob who the recipient of the payment is, and
3. Taking legal liability if Charlie colluded with Alice.

Final settlement: Bob 103b can monitor the list of public keys $P_{A_i}$, or he can be informed by Charlie 103c that there is payment from Alice 103a. As $TxID_2'$ is recorded on the blockchain, Charlie has no urgency to contact Bob 103b. It is not possible for Alice 103a to double spend the payment to Charlie as the corresponding outpoint has been spent. The settlement can be done by Bob 103b in fiat by transferring the balance from Alice's account to Charlie's account.

Alternatively, to make use of the trust from the blockchain, Charlie 103c can colour his output in $TxID_2'$ in Step 8 and spend his £75 as a divisible token. The next receiver, say a wood trader, Dave, would have to verify all the information tracing back to $TxID_1$.

The mechanism to divide a token into $2^t$ pieces for any non-negative integer t can be generically applied to any token system. As long as the token issuer acknowledges the William integer N, the token owner will have the flexibility to divide the token as they wish. Putting all the information required to exchange tokens on the blockchain creates a secure way to exchange fractions of a token.

CONCLUSION

It will be appreciated that the above embodiments have been described by way of example only. More generally there may be provided a method, apparatus or program in accordance with any one or more of the following Statements.

Statement 1: A computer-implemented method of generating a second transaction for a blockchain, the blockchain comprising a first transaction comprising a first token and a first output transferring an amount of a digital asset between a second party and a first party, the first token representing a first amount of a token asset other than the digital asset, the second transaction being for transferring a second token representing a second amount of the token asset from a first party to a third party; the method being performed by the first party and comprising: generating the second transaction, wherein the second transaction comprises i) a first input configured to unlock the first output of the first transaction, and ii) a first output comprising the second token, wherein the second token comprises data representing the second amount of the token asset, the second amount being less than the first amount.

Statement 2: The method of statement 1, wherein the data representing the second amount of the token asset comprises one or more values, each value being used to represent a respective sub-amount of the first amount of the token asset.

The method may comprise transmitting the second transaction to the second party and/or to the blockchain network for inclusion in the blockchain.

Statement 3: The method of statement 2, wherein each value is generated based on an identifier of the first transaction.

Statement 4: The method of statement 2 or statement 3, wherein each value is generated based on a modulus of a public key of the first party, and wherein the output of the second transaction comprises the modulus.

Statement 5: The method of statement 3 or statement 4, wherein each value is based on a root node of a binary tree structure, the root node being generated based on the identifier of the first transaction and/or the predetermined modulus, wherein the tree structure comprises a root layer comprising a root node, and a sequence of one or more child layers, each child layer comprising one or more pairs of child nodes, each pair being children of a respective node of a previous layer in the structure, wherein each node represents a respective amount of the token asset, the root node representing the first amount, and wherein each pair of child nodes together represent an amount equal to the amount represented by the respective node of the previous layer.

Statement 6: The method of statement 5, wherein each of the one or more values is a respective square root of a respective one of the one or more generated node.

The method may comprise generating each node of the tree structure. Alternatively, the method may comprise generating only a sub-set of the nodes, e.g. those needed to represent the second amount of the token asset.

Statement 7: The method of statement 5 or statement 6, wherein the root node is generated by applying a first cryptographic hash function to at least the identifier of the first transaction.

Statement 8: The method of statement 7, wherein the root node is generated by applying the first cryptographic hash function to at least the identifier of the first transaction and the modulus.

Statement 9: The method of statement 8, wherein the first token comprises the modulus.

Statement 10: The method of any of statements 5 to 9, wherein the first token represents the first amount A, wherein an $i^{th}$ layer of the tree structure comprises $2^{i-1}$ node, and wherein each node in the $i^{th}$ layer represents an amount $A*2^{1-i}$.

Statement 11: The method of any of statements 5 to 10, wherein each pair of child nodes comprises a first child node and a second child node, and wherein each first child node in the $i^{th}$ layer comprises a square root of the respective node of the previous layer, and wherein each second child node in the $i^{th}$ layer comprises a square root of the respective node of the previous layer, and a component generated by applying a second cryptographic hash function to at least the identifier of the first transaction.

The second cryptographic hash function may be applied to at least the identifier of the first transaction and the modulus.

Statement 12: The method of statement 11 when dependent on statement 7, wherein the first and second cryptographic hash functions are different cryptographic hash functions.

Statement 13: The method of any preceding statement, wherein the respective sub-amounts are different sub-amounts of the first amount, each representing a different amount of the token asset.

Statement 14: The method of any preceding statement, wherein the first output of the second transaction is an unspendable transaction output.

Statement 15: The method of any preceding statement, wherein the first output of the first transaction comprises a hash of the first token, and wherein the first input of the second transaction comprises the first token.

Statement 16: The method of any preceding statement, wherein the first input of the second transaction comprises a first public key of the first party and a digital signature generated based on a first private key corresponding to the first public key.

Statement 17: The method of statement 16, wherein the first transaction is generated by the second party, and wherein the method comprises: generating a shared private key based on a private key corresponding to a second public key of the first party and a public key of the second party; and generating the first public key of the first party based on the shared private key and the second public key of the first party.

Statement 18: The method of statement 17, wherein the second and third parties are a same party.

Statement 19: The method of any preceding statement when dependent on statement 4, comprising: generating a third public key of the first party, wherein the third public key comprises the modulus; and transmitting the third public key of the first party to the second party.

Statement 20: The method of any preceding statement, wherein the first input of the second transaction is configured to enable the third party to add a second input to the second transaction.

Statement 21: A computer-implemented method of generating a second transaction for a blockchain, the blockchain comprising a first transaction comprising a first token and a first output transferring an amount of a digital asset from a second party to a first party, the first token representing a first amount of a token asset other than the digital asset, the second transaction being for transferring a second token representing a second amount of the token asset from the first party to a third party; the method being performed by the third party and comprising: obtaining the second transaction, wherein the second transaction comprises i) a first input comprising the first token, and ii) a first output comprising the second token, wherein the second token comprises one or more values, each value being used to represent a respective sub-amount of the first amount of the token asset; determining whether the second token is a valid token based on whether a) each value is generated based on at least an identifier of the first transaction, and b) the first token in the second transaction is identical to the first token in the first transaction; based on said determination, updating the second transaction by signing the second transaction with a public key of the third party; and transmitting the updated second transaction to the blockchain network for inclusion in the blockchain.

Statement 22: The method of statement 21, wherein the first token comprises a modulus of a public key of the first party, and wherein said determining comprising determining whether c) each value is generated based on at least the identifier of the first transaction and the modulus.

Statement 23: The method of statement 21 or statement 22, wherein said determining comprises: determining whether d) each value is based on a root node of a binary tree structure, the root node being generated based on the identifier of the first transaction and/or the predetermined modulus, wherein the tree structure comprises a root layer comprising the root node, and a sequence of one or more child layers, each child layer comprising one or more pairs of child nodes, each pair being children of a respective node of a previous layer in the structure, wherein each node represents a respective amount of the token asset, the root node representing the first amount, and wherein each pair of child nodes together represent an amount equal to the amount represented by the respective node of the previous layer.

Statement 24: The method of statement 23, comprising: determining the second amount of the second token based on the respective amounts represented by the respective nodes corresponding to the one or more values.

Statement 25: The method of any of statements 21 to 24, wherein the first transaction comprises a hash of the first token, and wherein said determining of whether a) the first token in the second transaction is identical to the first token in the first transaction comprises determining that a hash of the first token in the second transaction is identical to the hash of the first token in the first transaction.

Statement 26: The method of any of statement 21 to 25, wherein said determining comprises determining whether d) an output of the first transaction referenced by the first input of the second transaction is an unspent transaction output.

Statement 27: The method of any of statements 21 to 26, wherein the second transaction comprises a hash of the second token, and wherein said determining comprises determining whether e) a hash of the second token is equal to the hash of the second token in the second transaction.

Statement 28: The method of any of statements 21 to 27, wherein said obtaining comprises receiving the second transaction from the first party.

Statement 29: The method of any of statements 21 to 28, comprising: generating the first transaction, wherein the first transaction comprises i) a first output configured to require, when executed alongside an input of the second transaction, the input of the second transaction to comprise a first public key of the first party in order to be unlocked; and transmitting the first transaction to the blockchain network for inclusion in the blockchain.

Statement 30: A computer-implemented method of generating a first transaction for a blockchain, the first transaction comprising a first output transferring an amount of a digital asset from a second party to a first party, the first transaction being for transferring a first token from the second party to the first party, the first token representing a first amount of a token asset other than the digital asset; the method being performed by the second party and comprising: generating the first transaction, wherein the first transaction comprises i) a first output configured to, when executed alongside an input of a second transaction, require the input of the second transaction to comprise a first public key of the first party in order to be unlocked, and ii) a second output comprising the first token, wherein the first token comprises a) the first amount of the token asset, b) an encrypted identifier of the first party, the encrypted identifier being generated by encrypting an identifier of the first party using a second public key of the first party, wherein the second public key comprises a modulus, and wherein the first token comprises c) the modulus.

Statement 31: The method of statement 30, wherein the identifier of the first party is a third public key of the first party.

Statement 32: The method of statement 30 or statement 31, comprising: generating a shared private key based on a private key of the second party and the second public key of the first party; and generating the first public key of the first party based on the shared private key and the second public key of the first party.

Statement 33: The method of statement 31 or statement 32, comprising: obtaining the second and/or third public keys of the first party from first party.

Statement 34: The method of any of statements 30 to 33, wherein the first transaction comprises iii) a third output configured to require, when executed alongside an input of a fourth transaction, the input of the fourth transaction to comprise a first public key of the second party in order to be unlocked.

Statement 35: The method of any of statements 30 to 34, wherein the first output of the first transaction comprises a hash puzzle configured to require, when executed alongside the input of the second transaction, the input of the second transaction to comprise the first token.

Statement 36: The method of any of statements 30 to 35, comprising: transmitting the first transaction to the blockchain network for inclusion in the blockchain.

Statement 37: The method of any of statements 30 to 36, comprising: obtaining the second public key of the first party; determining that the second public key is certified by a trusted party; and said transmitting comprising transmitting the first transaction only if the second public key is certified.

Statement 38: Computer equipment of the first party, comprising: memory comprising one or more memory units; and processing apparatus comprising one or more processing units, wherein the memory stores code arranged to run on the processing apparatus, the code being configured so as when on the processing apparatus to perform the method of any of statements 1 to 20.

Statement 39: A computer program embodied on computer-readable storage and configured so as, when run on computer equipment of the first party, to perform the method of any of statements 1 to 20.

Statement 40: Computer equipment of the third party, comprising: memory comprising one or more memory units; and processing apparatus comprising one or more processing units, wherein the memory stores code arranged to run on the processing apparatus, the code being configured so as when on the processing apparatus to perform the method of any of statements 21 to 29.

Statement 41: A computer program embodied on computer-readable storage and configured so as, when run on computer equipment of the third party, to perform the method of any of statements 21 to 29.

Statement 42: Computer equipment of the second party, comprising: memory comprising one or more memory units; and processing apparatus comprising one or more processing units, wherein the memory stores code arranged to run on the processing apparatus, the code being configured so as when on the processing apparatus to perform the method of any of statements 30 to 37.

Statement 43: A computer program embodied on computer-readable storage and configured so as, when run on computer equipment of the second party, to perform the method of any of statements 30 to 37.

Statement 44: A first transaction for inclusion in a blockchain, the first transaction being for transferring a first token from a second party to a first party, the first token representing a first amount of a token asset, and wherein the first transaction comprises i) a first output configured to, when executed alongside an input of a second transaction, require the input of a second transaction to comprise a first public key of the first party in order to be unlocked, and ii) a second output comprising the first token, wherein the first token comprises a) the first amount of the token asset, b) an encrypted identifier of the first party, the encrypted identifier being generated by encrypting an identifier of the first party using a second public key of the first party, wherein the second public key comprises a modulus, and wherein the first token comprises c) the modulus.

Statement 45: A computer-readable storage medium having stored thereon the first transaction of statement 44.

Statement 46: A second transaction for inclusion in a blockchain, the second transaction being for transferring a second token representing a second amount of a token asset from a first party to a third party, wherein the second transaction comprises i) a first input configured to unlock a first output of a first transaction that transfers an amount of a digital asset from a second party to a first party, the digital asset being different to the token asset, and ii) a first output comprising the second token, wherein the second token comprises data representing the second amount of the token asset, the second amount being less than the first amount.

Statement 47: A computer-readable storage medium having stored thereon the first transaction of statement 46.

According to another aspect of the teachings disclosed herein, there may be provided a method comprising the actions of some or all of the first, second and third parties.

According to another aspect of the teachings disclosed herein, there may be provided a system comprising the computer equipment of some or all of the first, second and third parties.

According to another aspect of the teachings disclosed herein, there may be provided a set of transactions comprising the first and second transactions.

Other variants or use cases of the disclosed techniques may become apparent to the person skilled in the art once given the disclosure herein. The scope of the disclosure is not limited by the described embodiments but only by the accompanying statements.

The invention claimed is:

1. A computer-implemented method of generating a second transaction for a blockchain, the blockchain comprising a first transaction comprising a first token and a first output transferring an amount of a digital asset between a second party and a first party, wherein the first output of the first transaction comprises a cryptographic hash of the first token, wherein the first output comprises a locking script configured, when executed by a blockchain node, to verify that an input of a later blockchain transaction that references the first output of the first transaction comprises the first token by performing a cryptographic hash function on the first token and comparing a result of the cryptographic hash function with the cryptographic hash of the first token, the first token representing a first amount of a token asset other than the digital asset, the second transaction being for transferring a second token representing a second amount of the token asset from a first party to a third party; the method being performed by the first party and comprising:
extracting the first token from the first transaction;
determining, based on the extracted first token, the first amount of the token asset;
determining a second amount of the token asset to transfer to the third party, the second amount being less than the first amount;
generating a second token comprising data representing the second amount of the token asset;

inputting the second token to a cryptographic hash function and executing the cryptographic hash function to generate a cryptographic hash of the second token;

generating the second transaction comprising a first input configured to unlock the first output of the first transaction when the first input is executed by a blockchain node together with the first output of the first transaction, by performing steps of:

encoding, into the first input of the second transaction, the first token;

encoding, into a first output of the second transaction, the second token, the cryptographic hash of the second token, and a locking script configured, when executed by a blockchain node, to cause the blockchain node to verify that an input of a later blockchain transaction that references the first output of the second transaction comprises the second token by performing a cryptographic hash function on the second token and comparing a result of the cryptographic hash function with the cryptographic hash of the second token; and transmitting the second transaction over a network to one, some or all of the second party, the third party, and/or the blockchain node.

2. The method of claim 1, wherein the data representing the second amount of the token asset comprises one or more values, each value being used to represent a respective sub-amount of the first amount of the token asset.

3. The method of claim 2, wherein each value is generated based on an identifier of the first transaction.

4. The method of claim 2, wherein each value is generated based on a modulus of a public key of the first party, and wherein the output of the second transaction comprises the modulus.

5. The method of claim 3, wherein each value is based on a root node of a binary tree structure, the root node being generated based on the identifier of the first transaction and/or a predetermined modulus, wherein the tree structure comprises a root layer comprising a root node, and a sequence of one or more child layers, each child layer comprising one or more pairs of child nodes, each pair being children of a respective node of a previous layer in the structure, wherein each node represents a respective amount of the token asset, the root node representing the first amount, and wherein each pair of child nodes together represent an amount equal to the amount represented by the respective node of the previous layer.

6. The method of claim 5, wherein each value is a respective square root of a respective one of the one or more generated node.

7. The method of claim 5, wherein the root node is generated by applying a first cryptographic hash function to at least the identifier of the first transaction.

8. The method of claim 7, wherein the root node is generated by applying the first cryptographic hash function to at least the identifier of the first transaction and the modulus.

9. The method of claim 8, wherein the first token comprises the modulus.

10. The method of claim 5, wherein the first token represents the first amount A, wherein an $i^{th}$ layer of the tree structure comprises $2^{i-1}$ node, and wherein each node in the $i^{th}$ layer represents an amount $A*2^{1-i}$.

11. The method of claim 5, wherein each pair of child nodes comprises a first child node and a second child node, and wherein each first child node in the $i^{th}$ layer comprises a square root of the respective node of the previous layer, and wherein each second child node in the $i^{th}$ layer comprises a square root of the respective node of the previous layer, and a component generated by applying a second cryptographic hash function to at least the identifier of the first transaction.

12. The method of claim 11, wherein the first and second cryptographic hash functions are different cryptographic hash functions.

13. The method of claim 2, wherein the respective sub-amount is a different sub-amount of the first amount, each representing a different amount of the token asset.

14. The method of claim 1, wherein the first input of the second transaction comprises a first public key of the first party and a digital signature generated based on a first private key corresponding to the first public key.

15. The method of claim 14, wherein the first transaction is generated by the second party, and wherein the method comprises:

generating a shared private key based on a private key corresponding to a second public key of the first party and a public key of the second party; and generating the first public key of the first party based on the shared private key and the second public key of the first party.

16. The method of claim 4, comprising:

generating a third public key of the first party, wherein the third public key comprises the modulus; and transmitting the third public key of the first party to the second party.

17. Computer equipment, comprising:

memory comprising one or more memory units; and processing apparatus comprising one or more processing units, wherein the memory stores code arranged to run on the processing apparatus, the code being configured so as when run on the processing apparatus, the processing apparatus performs a to perform the method of generating a second transaction for a blockchain, the blockchain comprising a first transaction comprising a first token and a first output transferring an amount of a digital asset between a second party and a first party, wherein the first output of the first transaction comprises a cryptographic hash of the first token, wherein the first output comprises a locking script configured, when executed by a blockchain node, to verify that an input of later blockchain transaction that references the first output of the first transaction comprises the first token by performing a cryptographic hash function on the first token and comparing a result of the cryptographic hash function with the cryptographic hash of the first token, the first token representing a first amount of a token asset other than the digital asset, the second transaction being for transferring a second token representing a second amount of the token asset from a first party to a third party; the method being performed by the first party and comprising:

extracting the first token from the first transaction;

determining, based on the extracted first token, the first amount of the token asset;

determining a second amount of the token asset to transfer to the third party, the second amount being less than the first amount;

generating a second token representing comprising data representing the second amount of the token asset;

inputting the second token to a cryptographic hash function and executing the cryptographic hash function to generate a cryptographic hash of the second token;

generating the second transaction comprising a first input configured to unlock the first output of the first transaction when the first input is executed by a blockchain node together with the first output of the first transaction, by performing steps of:

encoding, into the first input of the second transaction, the first token;

encoding, into a first output of the second transaction the second token, the cryptographic hash of the second token, and a locking script configured, when executed by a blockchain node, to cause the blockchain node to verify that an input of a later blockchain transaction that references the first output of the second transaction comprises the second token by performing a cryptographic hash function on the second token and comparing a result of the cryptographic hash function with the cryptographic hash of the second token; and transmitting the second transaction over a network to one, some or all of the first party, a third party, and/or the blockchain node.

18. A computer program product embodied on a non-transitory computer-readable storage including computer program code configured so as, when run on computer equipment of a first party, the computer equipment performs a method of generating a second transaction for a blockchain, the blockchain comprising a first transaction comprising a first token and a first output transferring an amount of a digital asset between a second party and a first party when executed by a blockchain node together with the first output of the first transaction, wherein the first output of the first transaction comprises a cryptographic hash of the first token, wherein the first output comprises a locking script configured, when executed by a blockchain node, to verify that an input of later blockchain transaction that references the first input of the first transaction comprises the first token by performing a cryptographic hash function on the first token and comparing a result of the cryptographic hash function with the cryptographic hash of the first token, the first token representing a first amount of a token asset other than the digital asset, the second transaction being for transferring a second token representing a second amount of the token asset from a first party to a third party; the method being performed by the first party and comprising:

extracting the first token from the first transaction;

determining, based on the extracted first token, the first amount of the token asset;

determining a second amount of the token asset to transfer to the third party, the second amount being less than the first amount;

generating a second token representing comprising data representing the second amount of the token asset;

inputting the second token to a cryptographic hash function and executing the cryptographic hash function to generate a cryptographic hash of the second token;

generating the second transaction comprising a first input configured to unlock the first output of the first transaction, by performing steps of:

encoding, into the first input of the second transaction, the first token;

encoding, into a first output of the second transaction the second token, the cryptographic hash of the second token, and a locking script configured, when executed by a blockchain node, to cause the blockchain node to verify that an input of a later blockchain transaction that references the first output of the second transaction comprises the second token by performing a cryptographic hash function on the second token and comparing a result of the cryptographic hash function with the cryptographic hash of the second token; and transmitting the second transaction over a network to one, some or all of the first party, a third party, and/or the blockchain node.

* * * * *